Jan. 31, 1967  M. M. SEELOFF  3,301,994

METHOD OF JOINING METAL SHEET OR STRIP

Filed Oct. 9, 1964

INVENTOR.
MELVIN M. SEELOFF
BY
Francis J. Klempay
ATTORNEY

United States Patent Office 3,301,994
Patented Jan. 31, 1967

3,301,994
METHOD OF JOINING METAL SHEET OR STRIP
Melvin M. Seeloff, Warren, Ohio, assignor to The Taylor-Winfield Corporation, Warren, Ohio, a corporation of Ohio
Filed Oct. 9, 1964, Ser. No. 402,705
6 Claims. (Cl. 219—117)

This invention relates generally to the electric resistance welding art and more particularly to an improved method for joining metal sheet and/or strip in general edge-to-edge or end-to-end relation whereby a continuation of the principal surfaces of either workpiece may be effected. The primary object of the present method is to speed up such joining of the metal sheet or strip while providing a weld of increased and consistent quality while the same time ironing down the stock in the region of the weld down to substantially the thickness of one or the other or both of the original workpieces. A method of this nature finds substantial usefulness in metal strip processing and utilization lines, for example, wherein it is desired to supply continuous strip at high speed from a successive series of discrete coils of the strip.

Because of the simplicity and high speed potential of the equipment required, it is generally preferred that the joining be done by an overlapped electric resistance seam welding process but this, of course, results in a narrow band along the weld line of a composite thickness substantially greater than the thickness of either workpiece. This must be reduced and heretofore many procedures have been suggested for accomplishing the same with varying results.

One of the more common proposals is to very narrowly overlap the adjacent edge portions of the workpieces to be welded together so as to reduce the quantity of metal which must be displaced when peening or planishing the line of weld down to the thickness of one or the other of the workpieces. However, difficulty has been experienced with this method when dealing with the softer metals such as aluminum, for example, because of the tendency of the sharp sheared edges or of the weld nugget itself to fracture the metal when the weld line is subjected to peening blows or to the heavy compression of planishing rolls or bars. Also, in this narrow overlap process the elongated weld nugget is necessarily quite narrow in width and when the weld zone is worked by peening or planishing it tilts upwardly to cause a shear plane thereby increasing the probability of fracture, and in any event the area of the weld is small, having low tensional strength upon subsequent pulling of the strip.

In an attempt to overcome the above problems it has also been proposed to seam weld along a line of greater overlap with the edge or end portions of the workpieces being previously prepared to facilitate the trimming off of the excess overlapped metal prior to peening or planishing down of the line of weld. Heretofore, however, this method has proved troublesome due to the tendency of tearing along the weld line when the scrap is totally removed, as it must be.

It is accordingly the primary object of the invention to provide an improved method of joining overlapped sheet or strip in which a higher rate of production may be obtained due to the lack of any requirement that the edges or ends of the workpieces be accurately prepared prior to the welding operation and in which the welded joint may be readily reduced in thickness while yet retaining a strong and consistent line of weld. In the method of this invention the excess overlapped metal is quickly and cleanly removed immediately after welding and in such configuration that the resulting offset in the welded product may readily be smoothed down to the desired thickness without weakening the weld or any of the parent metal in either original workpiece adjacent the weld.

The above and other objects and advantages of the invention will become apparent upon consideration of the following specification and the accompanying drawing wherein there is disclosed a preferred embodiment of the method of the invention.

Figure 1:
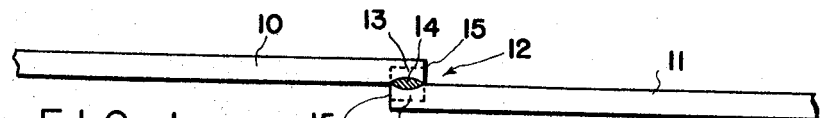
FIGURE 1 is a schematic showing of two metal strips which have been joined by the narrow lap seam welding process of the prior art.
Figure 2:
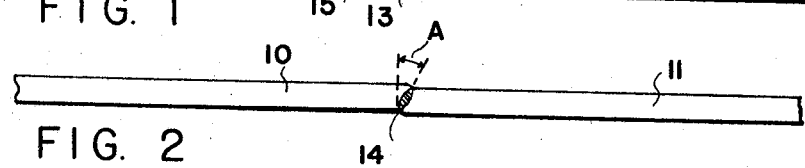
FIGURE 2 is a view of the weld of FIGURE 1 in the process of being flattened down to the thickness of the parent stock.

Considering first the prior art of FIGURES 1 and 2, reference numerals 10 and 11 are metal strip lengths which are to be joined together at 12 in general end-to-end relation. A narrow lap seam welding process is indicated here wherein narrow end portions 13 are overlapped in a precise manner prior to the traverse of the pressure-loaded seam welding electrodes (not shown herein) which traverse produces the elongated weld nugget 14. Since the overlap is commonly only of the order of $\frac{1}{16}$ inch, the end edges 15 of the workpieces must be precisely sheared before the weld takes place.

Further, in accordance with the prior art, the purpose of the narrow overlap is to reduce the quantity of metal which must be displaced when the elongated weld zone is reduced in thickness to or near the thickness of either of the workpieces 10 or 11, this reduction being accomplished by peening or planishing as is well understood in the art. However, studies of the process shown that the sharp edges of the end surfaces 15 of the workpieces tend to dig into the flat surfaces of the opposite workpieces and, in many instances, to fracture the solidified metal of the said opposite workpieces whereby lines of weakness are developed in the product. Also, the weld nugget 14, which is generally flat, tends to tilt upward to the angle indicated at A in FIGURE 2 which obviously creates a shear plane in the weld nugget under the peening hammers or the planishing rolls or dies and, in many cases, factures are thus induced in the weld metal. Further, it will be evident that the area of contact between the weld nugget and the adjacent parent metal of the workpieces 10 and 11 will be substantially no greater than the cross-sectional area of the workpieces. This makes for a rather weak joint in tension, particularly when dealing with workpieces of soft metal or of thin gauge, and heretofore this weakness has been the cause of considerable difficulty.

Figure 3:
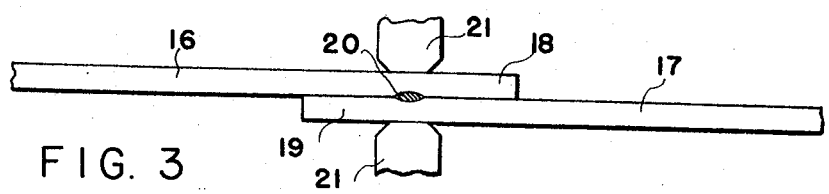
FIGURES 3, 4, 5 and 6 are schematic representations of four successive steps which are utilized in the method of my invention.

The above objects are overcome by the method of the present invention wherein, as shown in FIGURE 3 sheet metal or metal strip workpieces 16 and 17 are more widely overlapped as shown at 18 and 19, respectively, and thence seam welded together to establish a continuous flat weld nugget 20.

The welding in FIGURE 3 may be accomplished by a pair of rotary seam welding electrodes 21. In accordance with this method, the excess overlaps or scrap pieces 18 and 19 are severed from the welded joint immediately upon the weld taking place and the manner of severance for the scrap end 18, for example, is along a plane 22 which is normal to the plane of the workpiece 16 and also along a plane 23 which is angularly related to the plane of the workpiece 16. As shown, the plane 22 is on the opposite side of the weld nugget from the remaining workpiece 16 and the plane 23 is substantially tangent to the nugget. Scrap piece 19 is similarly severed from the workpiece 17. Various kinds of cutting tools 24 may be used to so cut off these scrap pieces, depending on the hardness and gauge of the workpieces but in most cases I prefer to rotary cutters of the kind disclosed and claimed in my co-pending application Serial No. 402,704 filed October 9, 1964, now Patent No. 3,278,718, dated October 11, 1966. Whatever tool or method is used, the severance is sufficiently complete that the scrap pieces are sufficiently detached to be removed by hand or by a suitable plow or other automated means provided for this purpose. The cutters 24 may be either driven or be simply idlers or even draw-cut type of tools.

Figure 4:
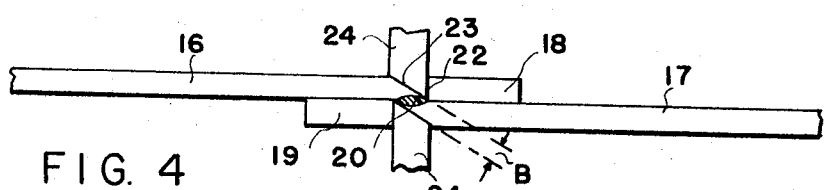

Reference to FIGURE 4 of the drawing shows that after severance of the scrap pieces 18 and 19 the workpieces 16 and 17 are joined by an angled offset having the thickness B, and that this offset includes the flat weld nugget 20. In actual practice the thickness B is only slightly greater than the thickness of either of the workpieces 16 and 17 which, as will appear later, greatly facilitates the flattening down of the area or line of weld into the plane of the stock 16 or 17.

Figure 4A:
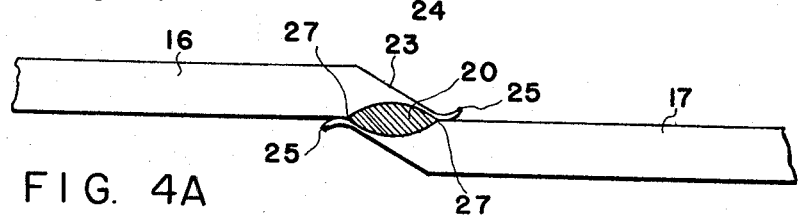
FIGURE 4A is an exaggerated showing of the condition of the joint immediately following the step of FIGURE 4.

In severing the scrap pieces 18 and 19, great care is taken to insure that the knife edge or edges of the tools employed do not cut into the surface of the parent stock 16 or 17 as this would create score lines tending to initiate fractures in these workpieces. Accordingly, the penetrating edges of the tools are stopped about a thousandth of an inch short of the surfaces of the underlying workpieces and this results in the creation of feather edges shown in exaggerated scale at 25 in FIGURE 4A. These edges are quite fine and are accordingly so weak that when the offset joint is peened or planished down into the plane of either one or both of the parent workpieces the edges won't bite into the parent workpieces to damage the same or initiate fractures therein.

Figure 5:
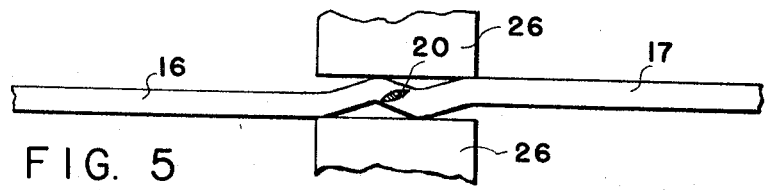
Figure 6:
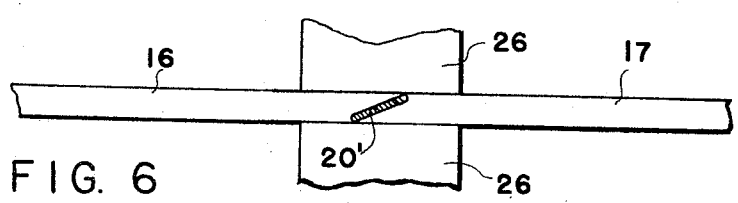

After the severed scrap pieces have been moved to the sides of the line of weld, the joint is gauged by peening tools or planishing rolls or bars as indicated schematically at 26 in FIGURES 5 and 6. In actual practice these peening or planishing tools are preferably carried by the same traversing head which carries the welding wheels 21, the peening or planishing equipment being carried closely behind the welding electrodes. Obviously, the scrap pieces are plowed or drawn away from the line of engagement of the peening or planishing tools before the same are brought into contact with the work.

At the first impact or compression of the peening or planishing tools, the joined sheet or strip assumes a wavy condition somewhat as shown in FIGURE 5. It should be noted, however, that since the initial offset due to the overlap the initially flat position of the nugget 20 is not seriously disturbed and consequently the severe shear condition which is illustrated in FIGURE 2 does not develop. Further, the feather edges 25 appear to offer some protection to the metal and metal fusion below them since test results do not show the development of any fractures along the lines 27 (FIG. 4A) where fractures would normally be expected to develop due to the bending action of the section. Rather, as the peening or planishing progresses, the weld nugget appears to lay down and flatten out to the final shape and position shown at 20' in FIGURE 6.

An analysis of the process herein disclosed indicates, first, that a better weld nugget or bead results from the greater overlap of the workpieces than in the case of the narrow overlap method of FIGURES 1 and 2. It is more consistent or uniform and flatter throughout its length, and its flat nature is translated to the final product represented by FIGURE 6. This is most advantageous because it substantially increases the fusion areas between the nugget and the parent metal thereby materially increasing the tensile strength of the joint. Also, during the transition stage from the offset of FIGURES 4 and 4A to the final product of FIGURE 6, there is no development of a severe shear condition as exists in FIGURE 2 so that less damage is done to the welding joint during the peening and/or planishing step.

Another singular advantage of the method of my invention is that after welding and removal of the excess scrap the flattening down of the overlapped joint into the plane of either or both of the parent workpieces may be accomplished with a minimum of force and consequently with a minimum of damage to the joint. As explained above, the thickness of the welded offset may be the same as or quite close to the thickness of the parent stock so that essentially only a bending action is required for flattening and there is little or no metal which is required to be displaced by peening or rolling. Consequently, moderate straightening forces are sufficient and no damage is done to the weld or to the parent metal of the workpiece at or adjacent to the areas of fusion. In actual practice, the equipment is so adjusted that sufficient metal—weld and parent—is left to insure a uniform continuous full-bodied thickness to the joint to permit maximum utilization of the product and/or efficient operation of any equipment which may subsequently process the product. However, only a very small amount of metal needs to be displaced and this is insufficient to cause waviness or fractures, including surface fissures, in the product.

Having thus described my invention what I claim is:

1. The method of joining metal sheet or strip which consists of overlapping the edge or end portions thereof to be joined, electric resistance welding said overlap portions together to establish a continuous weld nugget along the joint and between said portions, thereafter removing the free side edge portions of said first mentioned portions by a severing process which results in flatly inclined surfaces on opposite surfaces of the first mentioned portions which are substantially parallel to each other and on opposite sides of and closely adjacent to said continuous nugget, and thereafter applying a compressive force to opposite sides of the welded and overlapped portions in the region of the weld and along the line thereof to force said welded portions into substantially a common plane.

2. The method of joining metal sheet or strip comprising the steps of overlapping portions thereof to be joined, electric resistance welding said portions together to establish a continuous weld nugget along the line of the joint and between said portions, thereafter machining off the free side edge portions of the overlap from along lines extending parallel with and closely adjacent to said nugget, and thereafter applying a compressive force to the joined portions in the region of the weld and along the line thereof to force said joined portions substantially into a common plane.

3. The method of claim 1 including the further step of terminating the cutting of said flatly inclined surfaces short of the contiguous surfaces of the underlying workpieces whereby upon removal of said free side edge portions feathered edges are formed on said flatly inclined surfaces to protect said contiguous surfaces during the subsequent compression of the weld.

4. The method of joining metal sheet or strip which consists of overlapping the edge or end portions of the workpieces to be joined, electric resistance welding said overlapped portions together to establish a continuous weld nugget along the joint and between said portions, thereafter removing the free sections of said portions which lie outside the line of weld in a manner which leaves an angled offset connection between the workpieces with the continuous weld nugget lying in said connection, and thereafter applying compressive forces to the opposite sides or surfaces of the joined workpieces in the origin of the weld to iron said region down into the plane of at least one of said workpieces.

5. The method of claim 4 including the further step of feathering the edges of the workpieces at the lines where said free sections are severed during the severing operation and at the points of metal contact of the workpieces on either side of the weld, said feathered edges serving during the flattening to protect the contiguous parent surfaces of the workpieces.

6. The method of joining metal sheet or strip which consists of overlapping the edge or end portions of the workpieces to be joined, electric resistance welding said overlapped portions together to establish a continuous weld nugget between said overlapped portions, said nugget having greater width than thickness, thereafter removing the free sections of said portions outwardly to either side of said nugget, and thereafter working the joined metal to flatten the weld area into the plane of one or the other of said workpieces while angularly displacing the nugget with respect to said plane and increasing the width of the nugget in the direction of said plane.

References Cited by the Examiner

UNITED STATES PATENTS 2,892,921    6/1959    Mecklenborg _____ 219—83 X
3,021,416    2/1962    Mallett et al. _____ 219—82

RICHARD M. WOOD, *Primary Examiner.*

B. A. STEIN, *Assistant Examiner.*